United States Patent
DeRocher et al.

(10) Patent No.: US 11,124,656 B2
(45) Date of Patent: Sep. 21, 2021

(54) AQUEOUS DISPERSION OF MUTLISTAGE POLYMER PARTICLES

(71) Applicant: Rohm and Haas Company, Collegeville, PA (US)

(72) Inventors: Jonathan DeRocher, Coopersburg, PA (US); Andrew Hejl, Lansdale, PA (US); Jessica Levin, Philadelphia, PA (US); John J. Rabasco, Collegeville, PA (US); Antony K. Van Dyk, Blue Bell, PA (US); Kimy Yeung, Phoenixville, PA (US)

(73) Assignee: Rohm and Haas Company, Collegeville, PA (US)

( * ) Notice: Subject to any disclaimer, the term of this patent is extended or adjusted under 35 U.S.C. 154(b) by 163 days.

(21) Appl. No.: 16/511,061

(22) Filed: Jul. 15, 2019

(65) Prior Publication Data

US 2020/0024458 A1 Jan. 23, 2020

Related U.S. Application Data

(60) Provisional application No. 62/700,545, filed on Jul. 19, 2018.

(51) Int. Cl.
  *C09D 4/06* (2006.01)
  *C09D 133/10* (2006.01)
  *C09D 7/65* (2018.01)
(52) U.S. Cl.
  CPC .................. *C09D 4/06* (2013.01); *C09D 7/65* (2018.01); *C09D 133/10* (2013.01)
(58) Field of Classification Search
  CPC .................................................. C08F 2500/24
  See application file for complete search history.

(56) References Cited

U.S. PATENT DOCUMENTS

| 5,304,707 A * | 4/1994 | Blankenship ........... G21F 9/307 588/255 |
| 5,510,422 A | 4/1996 | Blankenship et al. |
| 5,527,613 A | 6/1996 | Blankenship et al. |
| 2008/0058473 A1 | 3/2008 | Freidzon et al. |
| 2018/0320007 A1 | 11/2018 | Bardman et al. |
| 2018/0355107 A1 | 12/2018 | Daugs et al. |
| 2018/0371174 A1 | 12/2018 | Daugs et al. |

FOREIGN PATENT DOCUMENTS

| EP | 3272778 | 1/2018 |
| WO | 2018182892 | 10/2018 |
| WO | 2018186946 | 10/2018 |

OTHER PUBLICATIONS

Songhan (Solvay RHODAFAC) (Year: 2020).*
Search report from corresponding European 19186651.6 application, dated Jan. 8, 2020.
"Process for Preparing an Aqueous Dispersion of Multistage Polymer Particles" by Jonathan Derocher et al. United States Provisional patent application filed, Jul. 19, 2018, U.S. Appl. No. 62/700,542.

* cited by examiner

*Primary Examiner* — Wenwen Cai
(74) *Attorney, Agent, or Firm* — Reid S. Willis

(57) ABSTRACT

The present invention relates to a composition comprising an aqueous dispersion of multistage polymer particles with a first phase comprising structural units of a carboxylic acid monomer and a nonionic ethylenically unsaturated monomer; and a second phase with a calculated $T_g$ of less than 50° C. and comprising a mixture of polymers which together comprise structural units of styrene or methyl methacrylate or both; structural units of one or of n-butyl acrylate, 2-ethylhexyl acrylate, ethyl acrylate, or n-butyl methacrylate; and structural units of a carboxylic acid monomer. The composition is useful as an open time additive in coatings formulations.

20 Claims, No Drawings

AQUEOUS DISPERSION OF MUTLISTAGE POLYMER PARTICLES

BACKGROUND OF THE INVENTION

The present invention relates to an aqueous dispersion of multistage polymer particles, which is useful as an open time additive in coatings formulations.

Government regulations and market movement continually drive toward zero volatile organic compounds (VOC) for coating formulations. Consequently, waterborne formulations that are free of volatile solvents and coalescents have become increasingly popular in the industry. Nevertheless, paint properties have been compromised due to this sea change; among them is open time, which is the period of time during which a freshly applied paint film can be reworked without leaving brush marks. In a solvent-borne system, open time is about 30 to 45 min; in a typical waterborne formulation, open time is on the order of 3 to 5 min. Accordingly, there is a need in the art to find an additive for waterborne formulations that increases open time over currently available additives without degrading other properties of the final coating, such as film adhesive and cohesive strength, hardness, block resistance, early blister resistance, scrub and wash resistance, stain resistance, and mar resistance.

SUMMARY OF THE INVENTION

The present invention addresses a need in the art by providing a composition comprising an aqueous dispersion of multistage polymer particles comprising a first and second phase, wherein:

a) the first phase comprises, based on the weight of the first phase, from 25 to 60 weight percent structural units of a carboxylic acid monomer or a salt thereof, and from 40 to 75 weight percent of a nonionic ethylenically unsaturated monomer; and wherein b) the second phase comprises a mixture of first and second polymers, wherein the first and second polymers together comprise, based on the weight of the second phase;
  i) from 20 to 65 weight percent structural units of styrene or methyl methacrylate or a combination thereof, with the proviso that the concentration of structural units of styrene in the second phase does not exceed 25 weight percent;
  ii) from 34.8 to 79.8 weight percent structural units of n-butyl acrylate, 2-ethylhexyl acrylate, ethyl acrylate, or n-butyl methacrylate, or a combination thereof; and
  iii) from 0.2 to 5 weight percent structural units of a carboxylic acid monomer or a salt thereof;

wherein the second phase has a calculated $T_g$ of not greater than 50° C.; wherein the weight-to-weight ratio of the first polymer to the second polymer is in the range of from 3:2 to 1:8; and wherein the weight-to-weight ratio of the first phase to the second phase is in the range of from 1:2 to 1:9. The composition of the present invention is useful as an open time additive in coating compositions.

DETAILED DESCRIPTION OF THE INVENTION

The present invention is a composition comprising an aqueous dispersion of multistage polymer particles comprising a first and second phase, wherein:

a) the first phase comprises, based on the weight of the first phase, from 25 to 60 weight percent structural units of a carboxylic acid monomer or a salt thereof, and from 40 to 75 weight percent of a nonionic ethylenically unsaturated monomer; and wherein b) the second phase comprises a mixture of first and second polymers, wherein the first and second polymers together comprise, based on the weight of the second phase;
  i) from 20 to 65 weight percent structural units of styrene or methyl methacrylate or a combination thereof, with the proviso that the concentration of structural units of styrene in the second phase does not exceed 25 weight percent;
  ii) from 34.8 to 79.8 weight percent structural units of n-butyl acrylate, 2-ethylhexyl acrylate, ethyl acrylate, or n-butyl methacrylate, or a combination thereof; and
  iii) from 0.2 to 5 weight percent structural units of a carboxylic acid monomer or a salt thereof;

wherein the second phase has a calculated $T_g$ of not greater than 50° C.; wherein the weight-to-weight ratio of the first polymer to the second polymer is in the range of from 3:2 to 1:8; and wherein the weight-to-weight ratio of the first phase to the second phase is in the range of from 1:2 to 1:9.

The multistage polymer particles of the present invention preferably have a core-shell morphology wherein the first phase corresponds to the core and the second phase corresponds to the shell. The core may be produced by a single stage or a multistage process, preferably in the presence of a chain transfer agent such as n-dodecyl mercaptan or mercaptoethanol. The core may also be prepared from a seed process.

Preferably, the first phase comprises from 30, more preferably from 35, and most preferably from 38 weight percent, to preferably 50, more preferably to 45, and most preferably to 42 weight percent structural units of a carboxylic acid monomer, based on the weight of the first phase. As used herein, the term "structural units" refers to the remnant of the recited monomer after polymerization. For example, a structural unit of methacrylic acid is as illustrated:

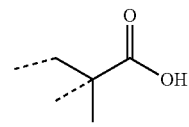

structural unit of methacrylic acid

The first phase also preferably comprises from 50, more preferably from 55, and most preferably from 58 weight percent, to preferably 70, more preferably to 65, and most preferably to 62 weight percent structural units of a nonionic ethylenically unsaturated monomer.

Examples of carboxylic acid functionalized monomers include methacrylic acid, acrylic acid, and itaconic acid, with acrylic acid and methacrylic acid being preferred. Examples of nonionic ethylenically unsaturated monomers include $C_1$-$C_{10}$ alkyl acrylates and methacrylates such as methyl methacrylate, ethyl acrylate, ethyl methacrylate, butyl acrylate, butyl methacrylate, and 2-ethylhexyl acrylate; and styrene. Methyl methacrylate and butyl methacrylate are preferred nonionic ethylenically unsaturated monomers.

The first phase preferably comprises less than 0.04 weight percent, more preferably less than 0.01 weight percent structural units of a multiethylenically unsaturated monomer such as ethylene glycol dimethacrylate, ethylene glycol diacrylate allyl methacrylate, allyl acrylate, 1,3-butane-diol dimethacrylate, 1,3-butane-diol diacrylate, diethylene glycol dimethacrylate, diethylene glycol diacrylate, trimethylol propane trimethacrylate, or divinyl benzene.

The average particle size of the first phase is preferably in the range of from 80 nm to 150 nm as measured by light scattering using a BI-90 Plus Brookhaven Particle Analyzer.

The first polymer of the second phase comprises from 80 to 99.5 weight percent structural units structural units of styrene or methyl methacrylate or a combination thereof, and from 0.5 to 20 weight percent structural units of a carboxylic acid monomer or a salt thereof, preferably methacrylic acid or acrylic acid. In one embodiment of the present invention the first polymer comprises from 80 to 99.5 weight percent structural units of styrene.

The second polymer of the second phase preferably comprises, based on the weight of the second polymer, from 35 to 60, more preferably to 50 weight percent structural units of methyl methacrylate; less than 20, more preferably less than 10, and most preferably less than 5 weight percent structural units of styrene; and from 40, more preferably from 50, to 65, more preferably to 60 weight percent structural units of n-butyl acrylate, 2-ethylhexyl acrylate, ethyl acrylate, or n-butyl methacrylate, or a combination thereof.

The second polymer may further include structural units of a sulfur acid containing monomer or a salt thereof, such as sodium styrene sulfonate, at a concentration in the range of from 0.1 to 0.5 weight percent, based on the weight of the second polymer. The second phase has a $T_g$ as calculated by the Fox equation of less than 50° C., preferably less than 40° C. As used herein calculated $T_g$ of the second phase refers to the weighted average calculated $T_g$ of the polymers in the second phase, preferably of the first and second polymers in the second phase.

Preferably, the concentration of structural units of styrene in the second phase does not exceed 20 weight percent, based on the weight of the second phase. The second phase preferably comprises less than 0.4 weight percent and more preferably less than 0.2 weight percent structural units of a multiethylenically unsaturated monomer, based on weight of second phase.

Preferably, the average particle size of the neutralized multistage polymer particles as measured by light scattering using a BI-90 Plus Brookhaven Particle Analyzer is in the range of from 150 nm, more preferably from 200 nm, to 400 nm, more preferably to 350 nm, most preferably to 320 nm. The solids content of the aqueous dispersion of multistage polymer particles is preferably in the range of from 10 to 30 weight percent.

The multistage polymer particles are prepared in multiple stages, preferably in three stages. In a preferred method, methacrylic acid (~40 parts by weight) and methyl methacrylate (~60 parts by weight) are copolymerized under emulsion polymerization conditions in a kettle to form a dispersion of polymer particles preferably with an average particle size in the range of from 100 nm to 150 nm. An aqueous emulsion of methacrylic acid (10 to 15 parts by weight) and styrene (85 to 90 parts by weight) is added to the heated kettle (~75 to 80° C.) over a 15- to 30-minute period and under emulsion polymerization conditions, after which time the kettle temperature is increased to a temperature in the range of from 85° C. to 95° C. After the completion of addition of the methacrylic acid and styrene, and during the ramping of the temperature, an aqueous emulsion of butyl acrylate, methyl methacrylate, and sodium styrene sulfonate are added to the kettle over time and under emulsion polymerization conditions at a temperature maintained in the range of from 85° C. to 95° C. Residual monomer is then chased and the dispersion is neutralized to a pH in the range of 7 to 9 with a suitable base such as alkali metal hydroxides, ammonia, amines, and alkanol amines such as 2-amino-2-methyl-1-propanol; the consequent dispersion of multistage polymer particles is conveniently filtered to remove coagulum.

The aqueous dispersion of multistage polymer particles is useful as an open time additive in a coatings composition, which includes a binder and a rheology modifier, and one or more of the following materials: dispersants, pigments, defoamers, surfactants, solvents, coalescents, biocides, opaque polymers, and colorants. The dispersion of multistage polymer particles can be used alone as an open time additive, or in combination with one or more ancillary additives. One such ancillary additive is a phenyl glycidyl ether represented by the following structure I:

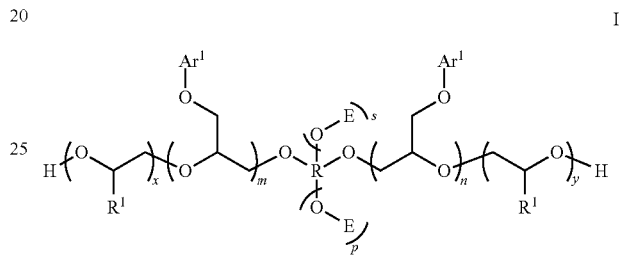

where the fragment

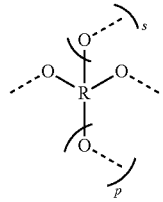

is a structural unit of a $C_2$-$C_{60}$ linear or a $C_3$-$C_{60}$ branched or cyclic diol, triol, or tetrol optionally functionalized with O atoms or aryl groups or both, or a structural unit of an unsubstituted aromatic diol, triol, or tetrol, or a structural unit of an aromatic diol, triol, or tetrol substituted with from 1 to 3 $C_1$-$C_6$ alkyl groups;

each $R^1$ is independently H or $C_1$-$C_6$ alkyl;

E is represented by the following structure:

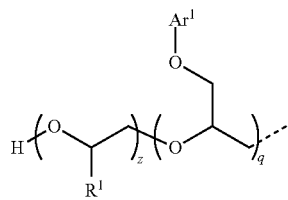

where m, n, and q are each independently from 1 to 20; x, y, and z are each independently from 1 to 50; p is 0 or 1; s is 0 or 1; and each $Ar^1$ is independently unsubstituted phenyl or naphthyl, or phenyl or naphthyl substituted with from 1 to 3 $C_1$-$C_6$ alkyl groups.

Examples of suitable diols useful for preparing the phenyl glycidyl ether of structure I include $C_2$-$C_{20}$ alkane diols such as 1,2-ethane diol, 1,3-propane diol, 1,4-butane diol, and 1,6-hexane diol, as well as alkoxylated derivatives of these diols; polyoxyalkylene diols of the type $H$—$(OCH_2CH(R^2))_b$—$OH$, where b is from 2 to 30, preferably 2, 3, or 4; and more preferably 3; and $R^2$ is H, methyl, or ethyl; aromatic diols such as 1,4-benzenedimethanol, catechol, resorcinol, and hydroquinone, as well as alkoxylated derivatives of these diols.

Example of suitable triols include trimethylolpropane, phloroglucinol, hydroxyquinol, pyrogallol, and glycerol, as well as alkoxylated derivatives of these triols; examples of suitable tetrols are pentaerythritol and benzenetetrol and alkoxylated derivatives of these tetrols.

Each $Ar^1$ is preferably independently phenyl, cresyl, or p-t-butylphenyl; preferably, m and n are each independently in the range of from 1, more preferably from 2, to 10, more preferably to 6, and most preferably to 5. Preferably, x and y are each independently from 5, more preferably from 10, to 30, more preferably to 25. Preferably, p and s are both 0.

Because each $R^1$ is independently H or $C_1$-$C_6$-alkyl, the alkylene oxide groups $((OCH_2CHR^1)_n)$ can be random or block copolymers. Preferably, each $R^1$ is independently H, methyl, or ethyl; more preferably H or methyl; most preferably each $R^1$ is H.

Examples of subclasses of the phenyl glycidyl ether of structure I are represented by the following structures:

For 1a, m+n is more preferably in the range of 2 to 8, more preferably to 6; and x+y is preferably in the range of 25, more preferably from 30 to 50, more preferably to 45.

For 1b, m+n+q is preferably in the range of from 4 to 8; and x+y+z is preferably in the range of from 30, more preferably from 35, to 50, more preferably to 45.

Another class of suitable ancillary open time additives is a phenyl glycidyl ether represented by the structure II:

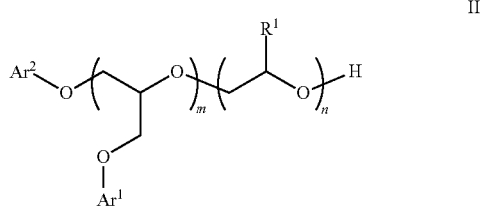

II where $Ar^1$, $Ar^2$, and $R^1$ are as previously described; and m is from 1, preferably from 2, to 20, preferably to 10, and more preferably to 6; and n is from 1, preferably from 5, to 100, more preferably to 60.

Other classes of suitable ancillary open time additives are secondary alcohol ethoxylates, commercial examples of which include TERGITOL™ Alcohol Ethoxylates; ethoxy-

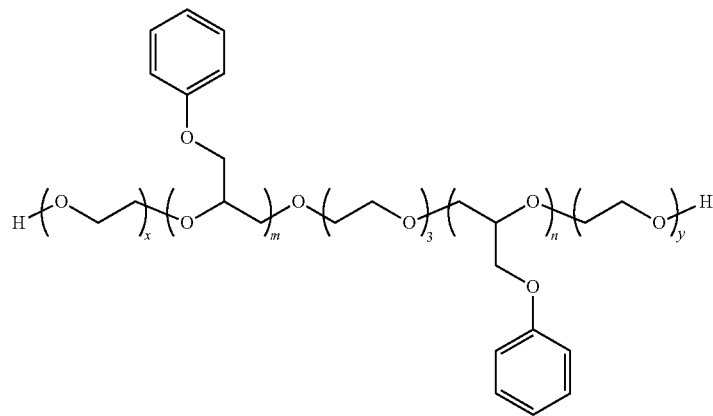

1a

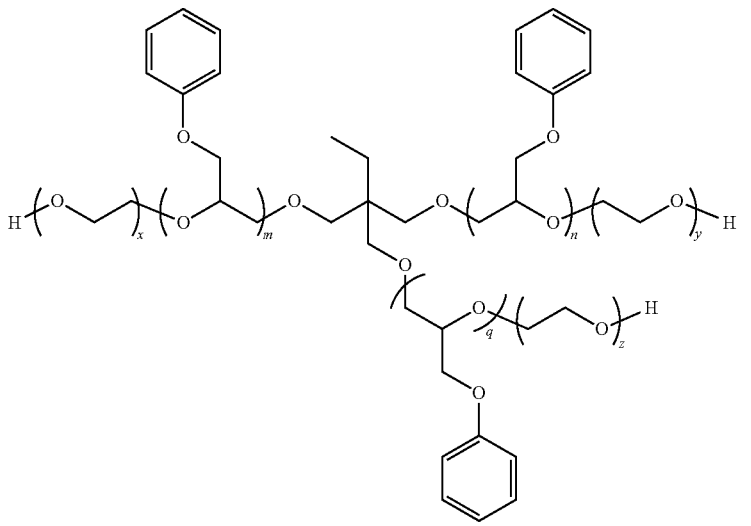

1b lated sorbitan esters, a commercial example of which is Ethsorbox 0-20 Ethoxylated Sorbitan ester; polyoxyethylene alkyl phosphates such as polyoxyethylene decyl ether phosphate (commercially available as Ethfac PD-6 surfactant) and polyoxyethylene tridecyl phosphate (commercially available as Ethfac 163/363 surfactant); alkyne ethoxylates such as ethoxylated 2,4,7,9-tetramethyl-5-decyn-4,7-diol (commercially available as Surfynol 485 alkyne ethoxylate); and EO/PO polylol block copolymers (commercially available as DOWFAX™ 63N40 Block Copolymer, A Trademark of The Dow Chemical Company or its Affiliates).

The concentration of the multistage polymer particles (dry weight) in the coating formulation is preferably in the range of from 0.5 to 5 weight percent based on the weight of the coating formulation. The concentration of the ancillary additive is preferably in the range of from 0.1, more preferably from 0.3 weight percent, to 1, more preferably 0.8 weight percent, based on the weight of the coating formulation. Preferably, the ancillary additive is used at a concentration of less than 50%, more preferably less than 25%, and most preferably less than 20% of the dry weight of the multistage polymer particles.

EXAMPLES

Open time was measured in accordance with ASTM-D7488. The test was performed in a constant temperature/humidity room (72° F., 50% RH). Paint was deposited on a black vinyl scrub chart using a drawdown bar with a 5-mil gap. The film was immediately scored by making parallel marks in the wet paint using two wooden applicators. Sections of the film were then brushed at timed intervals using a primed 1" nylon brush. The film was allowed to dry overnight. A panel of at least three readers visually inspected the panel and recorded the last cross brush section that showed no sign of the score marks as the open time.

Intermediate Example 1—Preparation of Phenyl Glycidyl Ether Ethoxylate Block Copolymer A 500-mL round-bottom flask equipped with a temperature controlled heating mantle, an addition funnel, a reflux/distillation head, and overhead stirrer was charged with triethyleneglycol (61.13 g, 0.407 mole) and KOH flakes (1.18 g, 90% pure). Phenyl glycidyl ether (247.47 g, 1.65 moles) was added over 5 h at 100° C., after which time the mixture was cooled to room temperature. A portion of the resultant intermediate (86.7 g) was charged into a conical bottom 2-L Parr reactor. The reactor was sealed, pressure checked, purged with $N_2$, then heated to 120° C. Ethylene oxide (151.0 g) was added at a rate of 0.2 to 0.3 g/min. The mixture was held at 120° C. for 1 h, then cooled to 60° C. before unloading the product (652.7 g). The reaction product was mixed with 0.18 g of acetic acid to achieve a product having the structure:

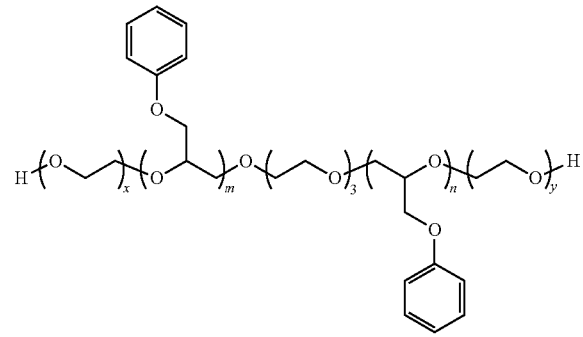

where m+n=4; and x+y=30.

Example 1—Preparation of a Dispersion of Multistage Polymer Particles

A. Preparation of $1^{st}$ Stage Core (60 MMA/40 MAA)

Deionized (DI) water (1760 g) was added to a 5-L, four-necked round bottom kettle equipped with a paddle stirrer, thermometer, $N_2$ inlet, and reflux condenser. The kettle was heated to 85° C. under $N_2$. A first monomer emulsion (ME1) was prepared by mixing DI water (720 g), Disponil FES-993 surfactant (29%, 5.38 g), methyl methacrylate (783.92 g), and methacrylic acid (10.1 g). A portion of ME1 (164.0 g) was removed and placed aside in a separate container. Disponil FES-993 surfactant (29%, 56.48 g), methyl methacrylate (78.4 g), and methacrylic acid (567.6 g) were added to the remaining ME1. When the kettle temperature reached 85° C., a solution of Actrene antifoulant (5% solution, 0.6 g) diluted with DI water (5 g) and a solution of DI water (160 g) and Disponil FES-993 surfactant (29%, 3.3 g) were added to the kettle, followed by the addition of the ME1 (164 g) initially removed and set aside. A solution of sodium persulfate (98%, 5.5 g) in DI water (40 g) was then added to the kettle. The temperature of the kettle dropped to ~76° C. and then was allowed to rise to 85° C. during a 15-min hold period. The remaining ME1 was then fed to the kettle over 2 h at 85° C. After completion of the ME1 feed, the reaction mixture was held at 85° C. for 15 min, whereupon the mixture was cooled to room temperature and filtered to remove any coagulum. The filtered product had a pH of 2.76, a solids content of 33.5%, and an average particle size of 132 nm as measured using a BI-90 Plus Brookhaven Particle Analyzer.

B. Preparation of a Dispersion of Alkali Swellable Polymer Particles with a 1:1:5 Core-tie-coat-Shell w/w/w Ratio and 40% Methacrylic Acid in the Core DI water (780 g) and glacial acetic acid (98%, 0.325 g) were added to a 5-L, four-necked round bottom flask (kettle) equipped with a paddle stirrer, thermometer, $N_2$ inlet, and reflux condenser. The kettle was heated to 90° C. under $N_2$. A second monomer emulsion (ME2) was prepared by mixing DI water (71.5 g), sodium dodecyl benzene sulfonate (SDS, 22.3%, 1.16 g), styrene (87.23 g), and methacrylic acid (13.13 g). A third monomer emulsion (ME3) was prepared by mixing DI water (126.1 g), SDS (22.3%, 6.02 g), linseed oil fatty acid (LOFA, 99.5%, 0.92 g), butyl acrylate (265.45 g), methyl methacrylate (199.97 g), and sodium styrene sulfonate (SSS, 90%, 2.59 g). When the kettle temperature reached 90° C., a solution of sodium persulfate (98%, 2.76 g) in DI water (9.75 g) was added to the kettle, followed by the dispersion of part A (278.07 g). The temperature of the kettle dropped to ~73° C. and was allowed to rise to 77° C. At 77° C., ME2 was fed to the kettle over 25 min with the temperature set to 81° C. After completion of the ME2 feed, the temperature was ramped to 92° C. During the ramping period (at 82° C.), ME3 was added at a rate of 10.4 g/min over 11 min. A solution of sodium persulfate (0.898 g) in DI water (97.5 g) was co-fed at a rate of 1.46 g/min over 11 min. After 11 min, the ME3 feed rate was increased to 15.73 g/min and the co-feed catalyst feed rate was increased to 2.76 g/min over 31 min. The temperature of the kettle was maintained at 92° C. throughout the addition of ME3. After completion of the additions of the ME3 and co-feed catalyst, a solution of iron sulfate heptahydrate (0.15% solution, 21.63 g) and VERSENE™ Chelating Agent (1.0% solution, 3.25 g, a Trademark of The Dow Chemical Company or its Affiliates) was added to the kettle and the reaction mixture was held at 92° C. for 15 min. The temperature was adjusted to 85° C.

and the mixture held at this temperature for 5 min. After the 5 min hold, a solution of t-butyl hydroperoxide (70% solution, 4.55 g) in DI water (6.63 g) was added to the kettle, followed by the addition of a solution of isoascorbic acid (98%, 2.82 g) in DI water (54.2 g) over 21 min. After the completion of addition of the isoascorbic acid solution, the reaction mixture was held at 85° C. for 15 min. The reaction mixture was cooled to 50° C., whereupon warm DI water (50° C., 851 g) was added to the kettle. A solution of sodium hydroxide (50% w/w, 35.62 g) in DI water (760.63 g) was fed to the kettle at 50° C. over 30 min. The reaction mixture was then held at 50° C. for 15 min then cooled to 30° C. At 40° C., a solution of KATHON™ LX Microbicide (1.5%, 13.31 g, a Trademark of The Dow Chemical Company or its Affiliates) in DI water (188.97 g) was fed to the kettle over 50 min. The contents of the kettle were then cooled to room temperature and filtered to remove any coagulum. The filtered product was found to have a pH of 7.34, a solids content of 16.7%, and an average particle size of 322 nm as measured using a BI-90 Plus Brookhaven Particle Analyzer.

Paint Formulations

Three paint formulations were prepared: Comparative Paint 1, which contains no open time additive; Paint 1, which contains both open time additives described in Example 1 and Intermediate Example 1; Paint 2, which contains the open time additive described in Example 1 only. Table 1 illustrates composition of Paints 1 and 2 and Comparative Paint 1. In Table 1, RHOPLEX, TRITON, KATHON, and ACRYSOL are all Trademarks of The Dow Chemical Company or its Affiliates; MSPP refers to the multistage polymer particles as prepared in Example 1, and PGEE refers to the phenyl glycidyl ether ethoxylate block copolymer as prepared in Intermediate Example 1.

TABLE 1

Paint Example 1 Formulation

|  | Control | | Exp. 1 | | Exp. 2 | |
| --- | --- | --- | --- | --- | --- | --- |
|  | Lbs | Gal | Lbs | Gal | Lbs | Gal |
| RHOPLEX ™ HG-706 Binder | 523.8 | 59.2 | 510.0 | 57.6 | 500.6 | 56.5 |
| BYK-024 Defoamer | 1.0 | 0.1 | 1.0 | 0.1 | 1.0 | 0.1 |
| Propylene Glycol | 4.3 | 0.5 | 4.3 | 0.5 | 4.3 | 0.5 |
| TRITON ™ X-100 Surfactant | 4.4 | 0.5 | 4.4 | 0.5 | 4.4 | 0.5 |
| Water | 10.0 | 1.2 | 9.9 | 1.2 | 9.9 | 1.2 |
| KATHON ™ LX 1.5% Biocide | 1.5 | 0.2 | 1.5 | 0.2 | 1.5 | 0.2 |
| TAMOL ™ 2002 Dispersant | 2.0 | 0.2 | 2.0 | 0.2 | 2.0 | 0.2 |
| Ammonia (28%) | 1.0 | 0.1 | 1.0 | 0.1 | 1.0 | 0.1 |
| Ti-Pure R-746 TiO$_2$ | 284.0 | 14.6 | 282.0 | 14.5 | 283.1 | 14.6 |
| Water | 58.2 | 7.0 |  |  |  |  |
| TEXANOL Coalescent | 7.9 | 1.0 | 7.8 | 1.0 | 7.8 | 1.0 |
| ACRYSOL ™ RM-2020E |  |  |  |  |  |  |
| Rheology Modifier ACRYSOL ™ RM-725 Rheology | 27.3 | 3.1 | 20.6 | 2.4 | 22.2 | 2.6 |

TABLE 1-continued

Paint Example 1 Formulation

|  | Control | | Exp. 1 | | Exp. 2 | |
| --- | --- | --- | --- | --- | --- | --- |
|  | Lbs | Gal | Lbs | Gal | Lbs | Gal |
| Modifier | 3.2 | 0.4 | 0.4 | 0.1 | 1.4 | 0.2 |
| BYK-024 Defoamer | 2.0 | 0.2 | 2.0 | 0.2 | 2.0 | 0.2 |
| MSPP (17% solids) |  |  | 182.3 | 21.4 | 183.0 | 21.5 |
| PGEE |  |  |  |  | 5.1 | 0.6 |
| Water | 97.4 | 11.7 |  |  |  |  |
| Totals | 1027.9 | 100.0 | 1029.2 | 100.0 | 1029.4 | 100.0 |

Table 2 shows the open time results for the three paints.

TABLE 2

Open Time for Paints

| Paint Ex. No. | Open Time Additive | Open Time (min) |
| --- | --- | --- |
| Paint 1 | 3% Ex 1 + 0.5% Int. Ex. 1 | 14.7 |
| Paint 2 | 3% Ex. 1 | 11.5 |
| Comp. 1 | NA | 7.0 |

The results show an improvement in open time when the multistage polymer particles are included in the paint formulation and a further improvement with the addition of a small amount of the PGEE. It has been further discovered that paint formulations that only contain the multistage polymer particles exhibit poorer leveling and lower gloss as compared with formulations that include an ancillary open time additive of the types described herein. Moreover, although PGEE alone can give an open time similar to that achieved by the combination of the multistage polymer particles and the PGEE, higher concentration of the PGEE are required, thereby adversely impacting water mark resistance, scrub resistance, and block resistance. The combination of the multistage polymer particles and the PGEE therefore give excellent open time without sacrificing other critical properties of the paint.

The invention claimed is:

1. A composition comprising an aqueous dispersion of multistage polymer particles wherein the multistage polymer particles comprise a first and second phase, wherein:
   a) the first phase comprises, based on the weight of the first phase, from 25 to 60 weight percent structural units of a carboxylic acid monomer or a salt thereof, and from 40 to 75 weight percent of a nonionic ethylenically unsaturated monomer; and wherein
   b) the second phase comprises a mixture of first and second polymers, wherein the first and second polymers together comprise, based on the weight of the second phase;
      i) from 20 to 65 weight percent structural units of styrene or methyl methacrylate or a combination thereof, with the proviso that the concentration of structural units of styrene in the second phase does not exceed 25 weight percent;

ii) from 34.8 to 79.8 weight percent structural units of n-butyl acrylate, 2-ethylhexyl acrylate, ethyl acrylate, or n-butyl methacrylate, or a combination thereof; and iii) from 0.2 to 5 weight percent structural units of a carboxylic acid monomer or a salt thereof;

wherein the second phase has a calculated $T_g$ of not greater than 50° C.; wherein the weight-to-weight ratio of the first polymer to the second polymer is in the range of from 3:2 to 1:8; and wherein the weight-to-weight ratio of the first phase to the second phase is in the range of from 1:2 to 1:9;

with the proviso that the first polymer of the second phase comprises from 0.5 to 20 weight percent of a carboxylic acid monomer and from 80 to 99.5 weight percent structural units of styrene; and wherein the second polymer of the second phase comprises less than 10 weight percent structural units of styrene.

2. The composition of claim 1 wherein the first phase comprises, based on the weight of the first phase, from 30 to 50 weight percent structural units of a carboxylic acid monomer or a salt thereof, and from 50 to 70 weight percent of a nonionic ethylenically unsaturated monomer; and further comprises less than 0.04 weight percent structural units of a multiethylenically unsaturated monomer.

3. The composition of claim 2 wherein the first polymer of the second phase comprises structural units of styrene or methyl methacrylate or a combination thereof, and from 0.5 to 20 weight percent structural units of a carboxylic acid monomer; and the second polymer of the second phase comprises from 35 to 60 weight percent structural units of methyl methacrylate; less than 20 weight percent structural units of styrene; and from 40 to 65 weight percent structural units n-butyl acrylate, 2-ethylhexyl acrylate, ethyl acrylate, or n-butyl methacrylate, or a combination thereof.

4. The composition of claim 3 wherein the second polymer of the second phase further comprises, based on the weight of the second phase, from 0.1 to 0.5 weight percent structural units of a sulfur acid containing monomer or a salt thereof, and less than 10 weight percent structural units of styrene.

5. The composition of claim 4 wherein the second polymer of the second phase comprises from 50 to 60 weight percent structural units of n-butyl acrylate, 2-ethylhexyl acrylate, ethyl acrylate, or n-butyl methacrylate, or a combination thereof; from 35 to 50 weight percent structural units of methyl methacrylate; less than 5 weight percent structural units of styrene; wherein the second phase comprises less than 0.2 weight percent structural units of a multiethylenically unsaturated monomer, based on weight of second phase; and wherein the sulfur acid containing monomer or a salt thereof is sodium styrene sulfonate.

6. The composition of claim 1 which further includes an ancillary additive which is a) a phenyl glycidyl ether represented by Structure I:

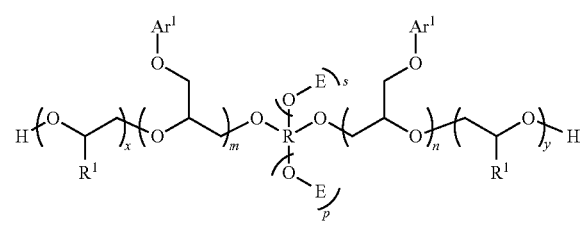

where the fragment

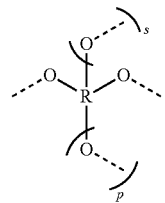

is a structural unit of a $C_2$-$C_{60}$ linear alkyl or a $C_3$-$C_{60}$ branched alkyl or diol, triol, or tetrol optionally functionalized with aryl groups, or a structural unit of an unsubstituted aromatic diol, triol, or tetrol, or a structural unit of an aromatic diol, triol, or tetrol substituted with from 1 to 3 $C_1$-$C_6$ alkyl groups;

each $R^1$ is independently H or $C_1$-$C_6$ alkyl;

E is represented by the following structure:

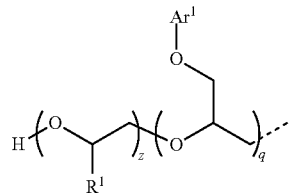

m, n, and q are each independently from 1 to 20; x, y, and z are each independently from 1 to 50; p is 0 or 1; s is 0 or 1; and each $Ar^1$ is independently unsubstituted phenyl or naphthyl, or phenyl or naphthyl substituted with from 1 to 3 $C_1$-$C_6$ alkyl groups; or b) a secondary alcohol ethoxylate;

c) an ethoxylated sorbitan ester;

d) a polyoxyethylene alkyl phosphate;

e) alkyne ethoxylates; or f) ethylene oxide/propylene oxide polyol block copolymers.

7. The composition of claim 1 which further includes an ancillary additive which is either of the following compounds:

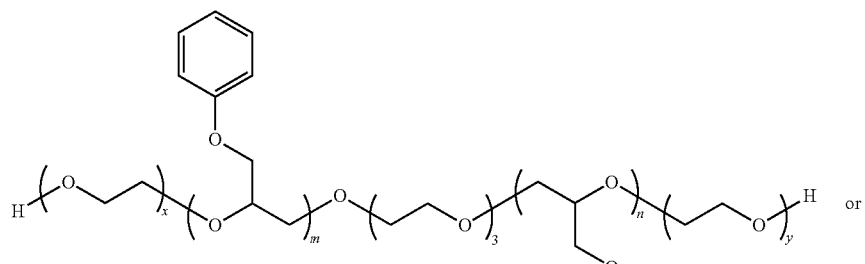

1a

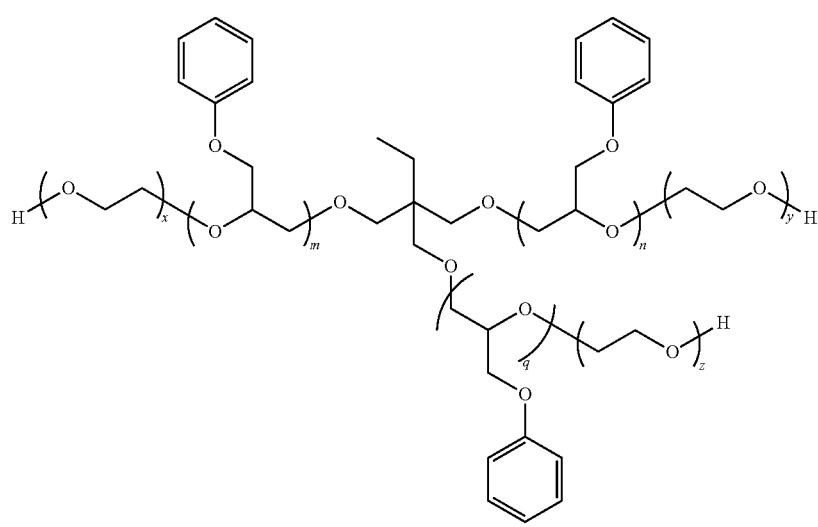

1b wherein, for compound 1a, m+n is in the range of 2 to 8; and x+y is in the range of 25 to 50; and for compound 1b, m+n+q is in the range of from 4 to 8; and x+y+z is in the range of from 30 to 50.

8. The composition of claim 1 which further includes one or more of a dispersant, a pigment, a defoamer, a surfactant, a solvent, an extender, a coalescent, a biocide, an opaque polymers, or a colorant.

9. The composition of claim 7 which comprises from 0.5 to 5 weight percent dry weight of the multistage polymer particles and from 0.1 to 1 weight percent of the ancillary additive, wherein the concentration of the ancillary additive is less than 25 percent of the dry weight of the multistage polymer particles; which composition further includes a binder, a defoamer, a surfactant, a biocide, a dispersant, $TiO_2$, a coalescent, and a rheology modifier.

10. A composition comprising an aqueous dispersion of multistage polymer particles, wherein the multistage polymer particles comprise a first and second phase, wherein:
   a) the first phase comprises, based on the weight of the first phase, from 25 to 60 weight percent structural units of a carboxylic acid monomer or a salt thereof, and from 40 to 75 weight percent of a nonionic ethylenically unsaturated monomer; and wherein
   b) the second phase comprises a mixture of first and second polymers, wherein the first and second polymers together comprise, based on the weight of the second phase;

i) from 20 to 65 weight percent structural units of styrene or methyl methacrylate or a combination thereof;
   ii) from 34.8 to 79.8 weight percent structural units of n-butyl acrylate, 2-ethylhexyl acrylate, ethyl acrylate, or n-butyl methacrylate, or a combination thereof; and
   iii) from 0.2 to 5 weight percent structural units of a carboxylic acid monomer or a salt thereof;
   wherein the second polymer of the second phase further comprises, based on the weight of the second phase, from 0.1 to 0.5 weight percent structural units of a sulfur acid containing monomer or a salt thereof, and less than 10 weight percent structural units of styrene;
   wherein the second phase has a calculated $T_g$ of not greater than 50° C.; wherein the weight-to-weight ratio of the first polymer to the second polymer is in the range of from 3:2 to 1:8; and wherein the weight-to-weight ratio of the first phase to the second phase is in the range of from 1:2 to 1:9.

11. The composition of claim 10 wherein the first polymer of the second phase comprises from 0.5 to 20 weight percent of a carboxylic acid monomer and from 80 to 99.5 weight percent structural units of styrene; the second polymer of the second phase comprises from 50 to 60 weight percent structural units of n-butyl acrylate, 2-ethylhexyl acrylate, ethyl acrylate, or n-butyl methacrylate, or a combination thereof; from 35 to 50 weight percent structural units of methyl methacrylate; less than 5 weight percent structural units of styrene; wherein the second phase comprises less than 0.2 weight percent structural units of a multiethylenically unsaturated monomer, based on weight of second phase.

12. The composition of claim 10 wherein the sulfur acid containing monomer or a salt thereof is sodium styrene sulfonate.

13. The composition of claim 10 which further includes an ancillary additive which is a) a phenyl glycidyl ether represented by Structure I:

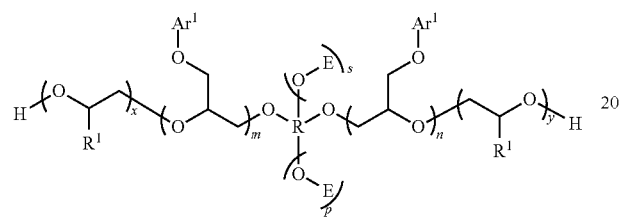

where the fragment

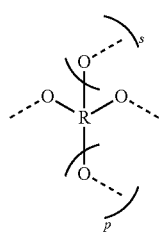

is a structural unit of a $C_2$-$C_{60}$ linear alkyl or a $C_3$-$C_{60}$ branched alkyl or cyclic diol, triol, or tetrol optionally functionalized with aryl groups, or a structural unit of an unsubstituted aromatic diol, triol, or tetrol, or a structural unit of an aromatic diol, triol, or tetrol substituted with from 1 to 3 $C_1$-$C_6$ alkyl groups;

each $R^1$ is independently H or $C_1$-$C_6$ alkyl;

E is represented by the following structure:

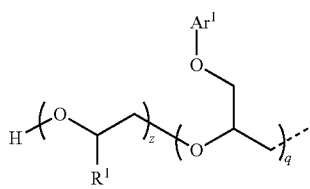

m, n, and q are each independently from 1 to 20; x, y, and z are each independently from 1 to 50; p is 0 or 1; s is 0 or 1; and each $Ar^1$ is independently unsubstituted phenyl or naphthyl, or phenyl or naphthyl substituted with from 1 to 3 $C_1$-$C_6$ alkyl groups; or b) a secondary alcohol ethoxylate;
c) an ethoxylated sorbitan ester;
d) a polyoxyethylene alkyl phosphate;
e) alkyne ethoxylates; or
f) ethylene oxide/propylene oxide polyol block copolymers.

14. The composition of claim 11 which further includes an ancillary additive which is either of the following compounds:

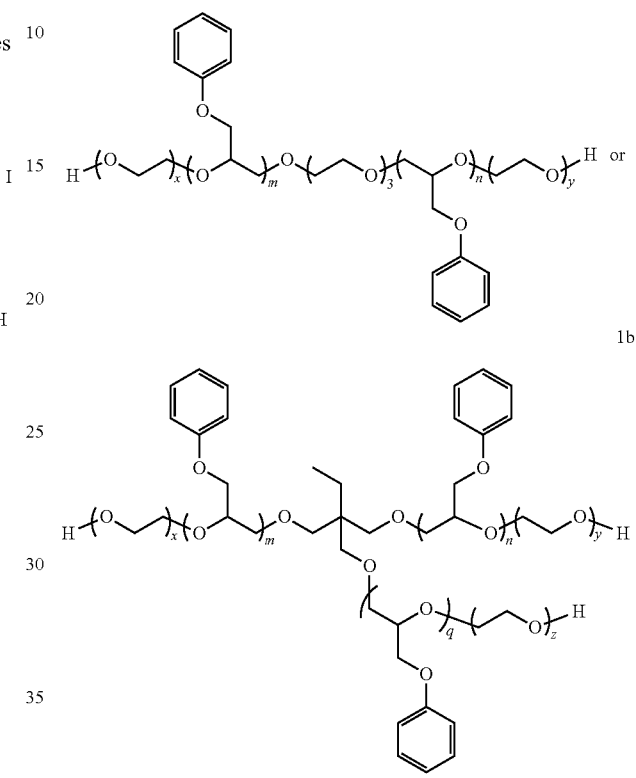

wherein, for compound 1a, m+n is in the range of 2 to 8; and x+y is in the range of 25 to 50; and for compound 1b, m+n+q is in the range of from 4 to 8; and x+y+z is in the range of from 30 to 50.

15. The composition of claim 10 which further includes one or more of a dispersant, a pigment, a defoamer, a surfactant, a solvent, an extender, a coalescent, a biocide, an opaque polymers, or a colorant.

16. The composition of claim 14 which comprises from 0.5 to 5 weight percent dry weight of the multistage polymer particles and from 0.1 to 1 weight percent of the ancillary additive, wherein the concentration of the ancillary additive is less than 25 percent of the dry weight of the multistage polymer particles; which composition further includes a binder, a defoamer, a surfactant, a biocide, a dispersant, $TiO_2$, a coalescent, and a rheology modifier.

17. A composition comprising an aqueous dispersion of multistage polymer particles, wherein the multistage polymer particles comprise a first and second phase, wherein:

a) the first phase comprises, based on the weight of the first phase, from 25 to 60 weight percent structural units of a carboxylic acid monomer or a salt thereof, and from 40 to 75 weight percent of a nonionic ethylenically unsaturated monomer; and wherein b) the second phase comprises a mixture of first and second polymers, wherein the first and second polymers together comprise, based on the weight of the second phase;

i) from 20 to 65 weight percent structural units of styrene or methyl methacrylate or a combination thereof, with the proviso that the concentration of structural units of styrene in the second phase does not exceed 25 weight percent;

ii) from 34.8 to 79.8 weight percent structural units of n-butyl acrylate, 2-ethylhexyl acrylate, ethyl acrylate, or n-butyl methacrylate, or a combination thereof; and iii) from 0.2 to 5 weight percent structural units of a carboxylic acid monomer or a salt thereof;

wherein the second phase has a calculated $T_g$ of not greater than 50° C.; wherein the weight-to-weight ratio of the first polymer to the second polymer is in the range of from 3:2 to 1:8; and wherein the weight-to-weight ratio of the first phase to the second phase is in the range of from 1:2 to 1:9;

wherein the composition further includes an ancillary additive which is a phenyl glycidyl ether represented by Structure I:

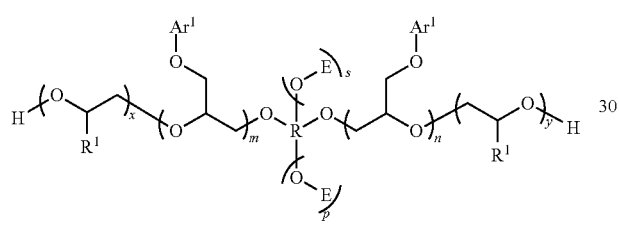

I where the fragment

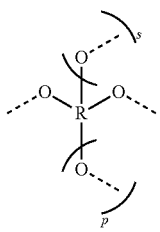

is a structural unit of a $C_2$-$C_{60}$ linear alkyl or a $C_3$-$C_{60}$ branched alkyl or cyclic diol, triol, or tetrol optionally functionalized with aryl groups, or a structural unit of an unsubstituted aromatic diol, triol, or tetrol, or a structural unit of an aromatic diol, triol, or tetrol substituted with from 1 to 3 $C_1$-$C_6$ alkyl groups;

each $R^1$ is independently H or $C_1$-$C_6$ alkyl;

E is represented by the following structure:

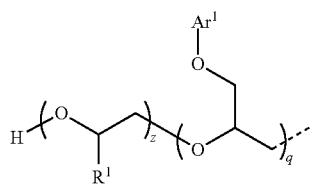

m, n, and q are each independently from 1 to 20; x, y, and z are each independently from 1 to 50; p is 0 or 1; s is 0 or 1; and each $Ar^1$ is independently unsubstituted phenyl or naphthyl, or phenyl or naphthyl substituted with from 1 to 3 $C_1$-$C_6$ alkyl groups.

18. The composition of claim 17 wherein the ancillary additive is either of the following compounds:

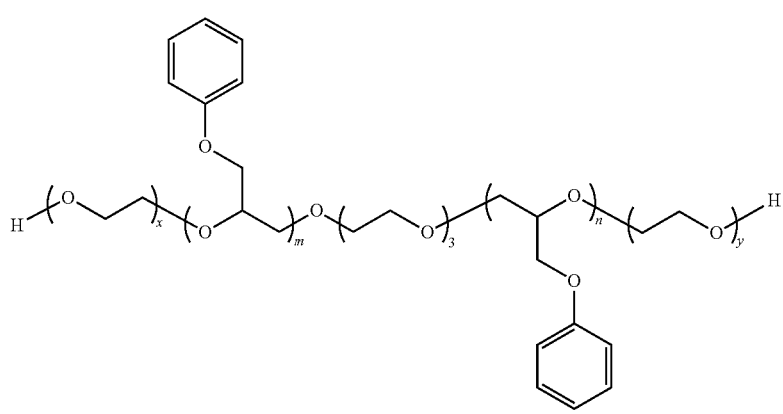

1a or

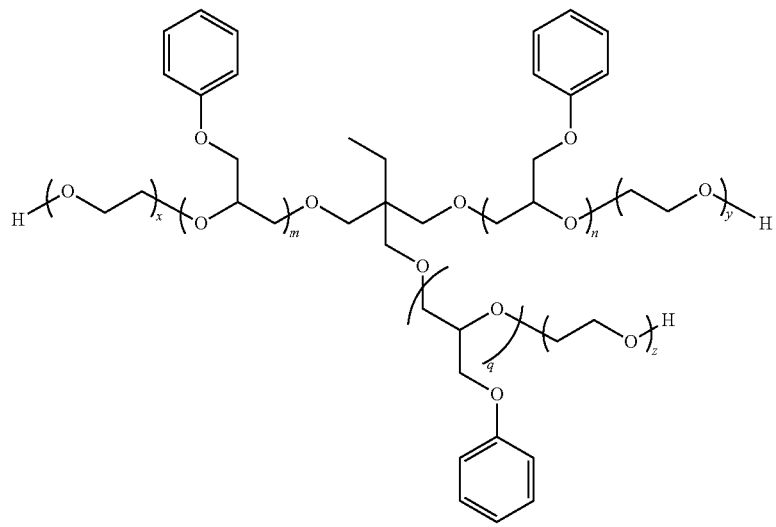

wherein, for compound 1a, m+n is in the range of 2 to 8; and x+y is in the range of 25 to 50; and for compound 1b, m+n+q is in the range of from 4 to 8; and x+y+z is in the range of from 30 to 50.

19. The composition of claim 17 which further includes one or more of a dispersant, a pigment, a defoamer, a surfactant, a solvent, an extender, a coalescent, a biocide, an opaque polymers, or a colorant.

20. The composition of claim 18 which comprises from 0.5 to 5 weight percent dry weight of the multistage polymer particles and from 0.1 to 1 weight percent of the ancillary additive, wherein the concentration of the ancillary additive is less than 25 percent of the dry weight of the multistage polymer particles; which composition further includes a binder, a defoamer, a surfactant, a biocide, a dispersant, $TiO_2$, a coalescent, and a rheology modifier.

* * * * *